United States Patent
Grunow et al.

(10) Patent No.: US 7,256,990 B2
(45) Date of Patent: Aug. 14, 2007

(54) VERTICAL DOCKING METHOD AND SYSTEM

(75) Inventors: David W. Grunow, Round Rock, TX (US); Patrick V. Illingworth, Austin, TX (US); John A. Jeffries, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 38 days.

(21) Appl. No.: 10/652,359

(22) Filed: Aug. 29, 2003

(65) Prior Publication Data

US 2005/0047104 A1 Mar. 3, 2005

(51) Int. Cl.
*G06F 1/16* (2006.01)
*G06F 13/00* (2006.01)

(52) U.S. Cl. .................. 361/686; 710/303; 710/304
(58) Field of Classification Search ............... 361/686; 710/303–304
See application file for complete search history.

(56) References Cited

U.S. PATENT DOCUMENTS

| 5,030,128 | A | * | 7/1991 | Herron et al. ............ 439/372 |
| 5,568,359 | A | | 10/1996 | Cavello et al. |
| 5,604,663 | A | * | 2/1997 | Shin et al. ................ 361/686 |
| 5,818,691 | A | | 10/1998 | McMahan et al. |
| 6,119,184 | A | * | 9/2000 | Takahama .................. 710/303 |
| 6,209,105 | B1 | * | 3/2001 | Hamamoto ................ 713/300 |
| 6,563,698 | B1 | | 5/2003 | Ozias et al. |
| 6,570,758 | B1 | * | 5/2003 | Maeda ...................... 361/686 |
| 6,590,767 | B2 | | 7/2003 | Liao et al. |
| 6,687,123 | B2 | * | 2/2004 | Kitahara ................... 361/695 |
| 6,697,252 | B2 | * | 2/2004 | Maeda ...................... 361/686 |
| 6,744,627 | B2 | * | 6/2004 | Won et al. ................. 361/686 |
| 6,982,702 | B1 | * | 1/2006 | Frame ....................... 345/168 |

* cited by examiner

Primary Examiner—Boris Chervinsky
Assistant Examiner—Zachary Pape
(74) Attorney, Agent, or Firm—Haynes and Boone, LLP

(57) ABSTRACT

In a method and system for detachably docking a portable device to a docking device, the docking device is placed on a stable surface. The docking device includes a pair of moveable rear latches and moveable front latches, which are operable to latch on to corresponding matching slots of the portable device when docked. The portable device is aligned vertically on top of the docking device. A vertical force is applied on the portable device. When properly aligned a pair of alignment pins included in the docking device mate with corresponding notches on the portable device when the two devices are docked. A release latch on the docking device is operable to undock the two devices.

21 Claims, 4 Drawing Sheets

VERTICAL DOCKING METHOD AND SYSTEM

BACKGROUND

The present disclosure relates generally to information handling systems, and more particularly to a docking apparatus and method used in conjunction with information handling system portable devices such as a notebook computer, personal digital assistant (PDA), and gaming console.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Typically, portable devices such as notebook computers are not able to offer the same range of functionality as desktop computers. The functionality may include a choice of a wide range of peripherals such as optical disk drives, additional power sources, I/O ports or multimedia components. A common strategy to offer an increase in the functionality of the portable notebook computer without incurring a penalty in the weight and/or the size of the portable notebook computer is to use an optional docking station.

The docking station is basically an interconnecting structure designed to be left in place on a home or office desktop computer. The portable notebook computer may be removably connected to the docking station by engaging or mating means such as mating plugs, latches, hooks or sockets attached to the portable notebook computer and the associated docking station. The docking station is typically connected to external desktop peripheral devices, such as a monitor, keyboard and mouse, which typically remain in place on the desktop workstation. Disposed within the docking station housing are various components that serve to operatively connect devices when the portable notebook computer is plugged into the docking station. However, the docking station is typically not provided with a processor. Instead when the portable notebook computer is "docked" in this manner, the processor of the portable notebook computer is utilized in the resulting desktop computer workstation and the desktop keyboard, monitor and mouse are used in any subsequent desktop computing tasks. After these tasks are completed, the portable computer can simply be unplugged from the docking station and carried away for use in its usual self-contained laptop mode. Therefore, the function of a docking station is to effect connection between the portable computer and various pieces of ancillary or peripheral devices without the need for individual cable connections to the portable computer, thereby facilitating the conversion of the portable computer between its laptop mode of operation and a desktop mode of operation.

As is well known, there are many types and styles of docking stations, such as port replicators, enhanced port replicators, mini-docks, full docking stations, and cable docks, all of which provide an interface with the portable notebook computer to enhance its functionality. Docking stations typically support horizontal positioning of the portable notebook computer for docking.

Today, due to advances in chip technology the information handling system portable devices such as notebook computers are getting smaller, lighter and more powerful with each new generation. Present generation of 'ultra portable' notebook computers weigh less than 3 pounds and are less than an inch thick. Typically, these ultra thin, ultra portable notebook computers are not able to offer the same range of functionality as the full size notebook computers and/or desk top computers. Using an optional media slice module may extend the functionality of the ultra thin portable notebook computer. FIG. 1 illustrates a traditional media slice module 105.

The media slice module 105 may be viewed as a portable version of the traditional docking station. The media slice module 105 typically weighs only about 1–2 pounds, and is operable to detachably dock to an information handling system portable device 101 (also referred to as a portable notebook computer, notebook computer, portable device, laptop computer, PDA or gaming console). Like the traditional docking station, the media slice 105 is typically not provided with a processor. However, unlike the traditional docking station, which is generally left in place on a home or office desktop computer, the media slice 105 is typically designed to be as equally portable as the portable device 101. That is, while the portable device 101 and the media slice 105 are docked they are designed to be a portable unit and operate as one integrated portable computer providing increased functionality.

The size and shape of the media slice module 105 shown substantially resembles a rectangular prism having a length L, a height H and a depth D. In one example, the media slice module 105 is approximately 10.8" long, 0.8" high and 9.3" deep. The exact dimensions may vary depending of the manufacturer. The shape and size of the media slice module 105 is typically consistent with that of the portable device 101, with the dimensions of the media slice module 105 slightly exceeding those of the portable device 101 to enable a snug fit when docked. In a docked position the front, rear, left and right edge surfaces of the portable device 101 are substantially included within with the corresponding front, rear, left and right edge surfaces of the media slice module 105. As described herein, references to the front, rear, left and right are relative to the front, rear, left and right of the portable device 101.

The media slice module 105 includes a substantially planar top section 110 to receive a bottom section 102 of the portable device 101, a pair of moveable rear latches 120 positioned approximately at each corner of the rear edge, an electrical connector 130 for electrically coupling the media slice module 105 to the portable device 101, and a pair of fixed front latches 140 positioned approximately at each corner of the front edge.

Each moveable latch in the pair of moveable rear latches 120 typically includes a spring mechanism (not shown). When a lateral force, which is substantially parallel to the planar top section 110, is applied to the moveable latch, it causes a slight movement of the latch thereby increasing the tension in the spring mechanism. The lateral force is withdrawn when the pair of moveable rear latches 120 'latch on', 'snap on' or 'dock to' a pair of matching slots (not shown), which are typically included on the bottom section 102 of the portable device 101. When properly docked, the pair of moveable rear latches 120 return to their normal position and the spring mechanism loses the tension. Each fixed latch in the pair of fixed front latches 140 is fixed and does not move when a lateral force is applied. Also, there is no spring mechanism associated with the fixed latch.

To properly dock the portable device 101 to the media slice module 105, the user is required to toe the front of the device into the pair of fixed front latches 140 to latch and then lower the back of the device onto the pair of moveable rear latches 120 and press to latch. FIG. 1 also illustrates the device 101 being aligned at an angle relative to the media slice module 105 to achieve the toe in. This process is similar to putting on a shoe where the front portion of the foot is toed into the front of the shoe first and then the heel portion of the foot is lowered into the shoe to fit snugly. A pair of release latches 150 is independently operable to release each of the pair of moveable rear latches 120 to undock the portable device 101 from the media slice module 105.

However, present docking mechanisms are not easy to use for users and often results in causing damage to the media slice module 105 and/or the portable device 101. For example, users often place the portable device 101 vertically on the media slice module 105 rather than at an angle (that is, attempt docking without toeing in), thereby leaving one or both of the pair of fixed front latches 140 unlatched. The user is often frustrated since the media slice module 105 fails to operate in the apparently docked position due to the improper latching. In some cases, to remedy the situation the user may forcibly press the portable device 101 vertically on the media slice module 105 (without toeing in), thereby potentially causing permanent damage to the latching components of the portable device 101.

Therefore, a need exists to improve the docking techniques for portable devices. More specifically, a need exist to develop a docking apparatus and method for an improved docking between the media slice module and the portable device. Accordingly, it would be desirable to provide tools and techniques for an improved docking station for a portable information handling system absent the disadvantages found in the prior methods discussed above.

SUMMARY

The foregoing need is addressed by the teachings of the present disclosure, which relates to a system and method for an improved docking between a docking device such as the media slice module and a portable device for example a portable computer. According to one embodiment, in the system and method for detachably docking a portable device to a docking device, the docking device is placed on a stable surface. The docking device includes a pair of moveable rear latches and moveable front latches, which are operable to latch on to corresponding matching slots of the portable device when docked. The portable device is aligned substantially vertically on top of the docking device. A vertical force is applied on the portable device. When properly aligned a pair of alignment pins included in the docking device mate with corresponding notches on the portable device when the two devices are docked. A release latch on the docking device is operable to undock the two devices.

In one embodiment, applying the substantially vertical force on the portable device causes the pair of moveable rear latches and moveable front latches to be slightly moved in an outwardly or inwardly direction.

In one embodiment, each of the pair of moveable rear latches and the moveable front latches include a spring mechanism capable of providing a lateral force to latch the portable device in response to the vertical force. The spring mechanism is in a loaded position when the portable device is docked with the docking device.

Several advantages are achieved by the method and system according to the illustrative embodiments presented herein. The embodiments advantageously provide for a reduced occurrence of operating conflicts and improved reliability while reducing the number of components.

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various devices or components described herein may be implemented as hardware (including circuits) and/or software, depending on the application requirements.

Figure 1:
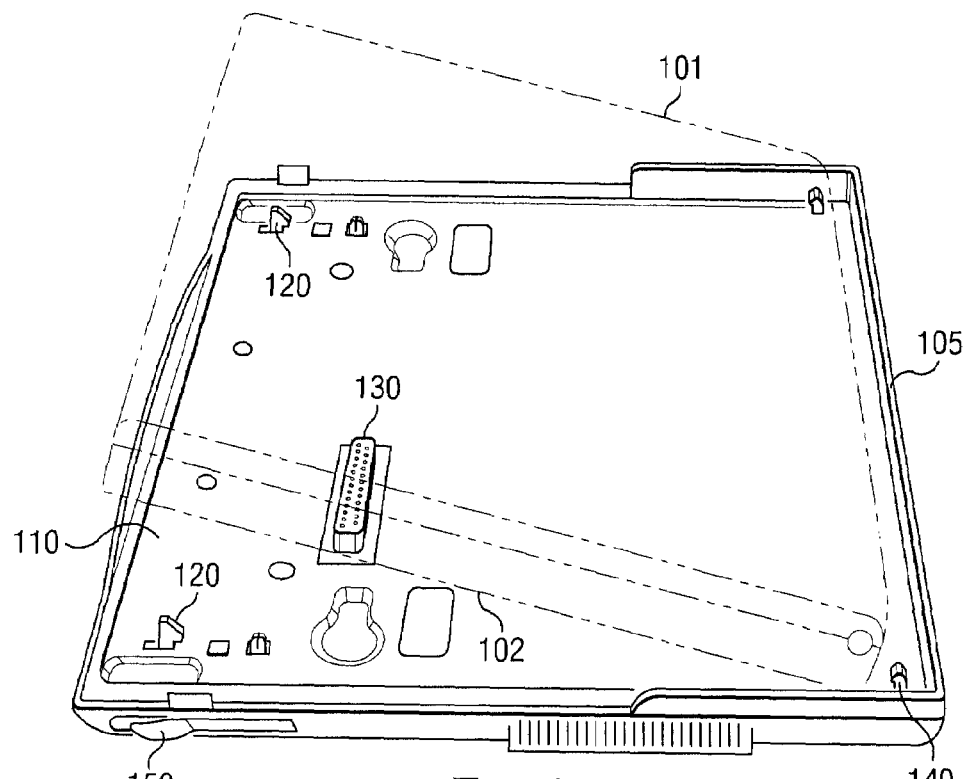
FIG. 1 (PRIOR ART), described hereinabove, illustrates a view in perspective of a traditional media slice module operable to dock a portable computer.

Many docking systems available today provide a horizontal docking means, whereby the portable device is placed horizontally into or on the docking station for docking. Some docking systems such as described in FIG. 1, provide a docking mechanism to toe in the front portion of the device to engage the pair of fixed latches 140. However, the docking mechanism is not easy to use for users. For example, users often place the portable device vertically on the media slice module 105 (without toeing in), thereby leaving one or both of the pair of fixed front latches 140 unlatched. The user is often frustrated because the media slice module 105 fails to operate due to the improper latching. It would be desirable to improve the docking mechanism for devices. According to one embodiment, in the system and method for detachably docking a portable device to a docking device, the docking device is placed on a stable surface. The docking device includes a pair of moveable rear latches and moveable front latches, which are operable to latch on to corresponding matching slots of the portable device when docked. The portable device is aligned substantially vertically on top of the docking device. A vertical force is applied on the portable device. When properly aligned a pair of alignment pins included in the docking device mate with corresponding notches on the portable device when the two devices are docked. A release latch on the docking device is operable to undock the two devices.

Figure 2A:
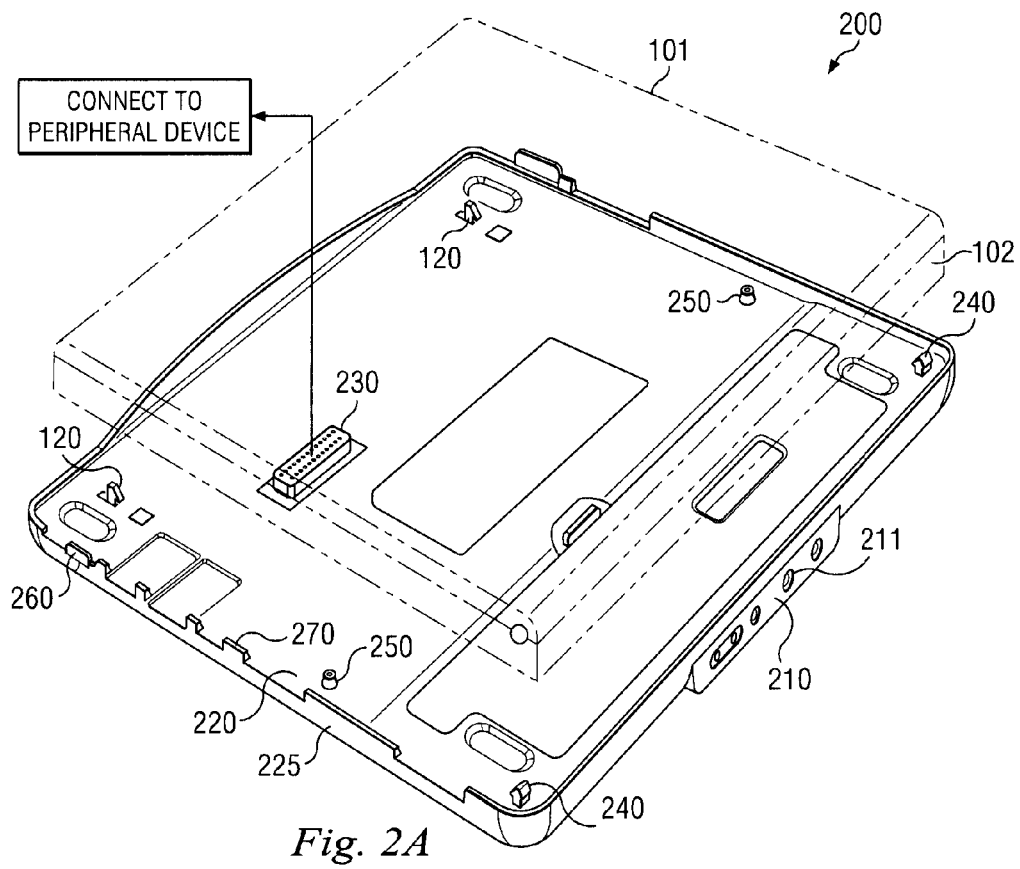
FIG. 2A is a view in perspective of a docking system, according to an embodiment.

FIG. 2A illustrates a view in perspective of a docking system 200, according to an embodiment. In the depicted embodiment, the docking system 200 includes a docking device 210 operable to detachably dock the portable device 101. The docking device 210 shown is portable like the media slice module 105.

The size and shape of the docking device 210 shown substantially resembles a rectangular prism having a length L, a height H and a depth D. In one example, the docking device 210 is approximately 10.8" long, 0.8" high and 9.3" deep. The exact dimensions may vary depending of the manufacturer. The shape and size of the docking device 210 is typically consistent with that of the portable device 101, with the dimensions of the docking device 210 slightly exceeding those of the portable device 101 to enable a snug fit when docked. In a docked position the front, rear, left and right edge surfaces of the portable device 101 are substantially included within with the corresponding front, rear, left and right edge surfaces of the docking device 210. As described earlier, references to the front, rear, left and right is relative to the front, rear, left and right of the portable device 101.

The docking device 210 includes the substantially planar top section 220 to receive a bottom section 102 of the portable device 101, a substantially planar bottom section 225 to placed in contact with a stable surface (not shown), the pair of moveable rear latches 120 positioned approximately at each corner of the rear edge, an electrical connector 230 for electrically coupling the docking device 210 to the portable device 101, and a pair of moveable front latches 240 positioned approximately at each corner of the front edge. In one embodiment, the electrical connector 230 may be the same as the electrical connector 130. In one embodiment, the pair of moveable front latches 240 may be substantially similar to the pair of moveable rear latches 120 except for their orientation (that is the latches are positioned facing each other). Further details of the moveable latches 240 and 120 are described in FIGS. 2B and 2C, respectively.

Figure 2B:
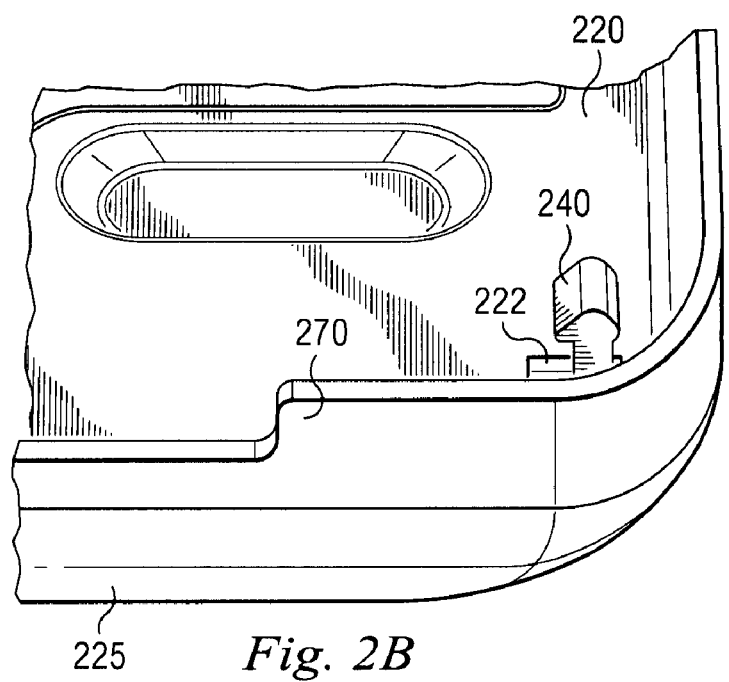
FIG. 2B illustrates additional detail of a moveable front latch included in the docking device of FIG. 2A, according to an embodiment.
Figure 2C:
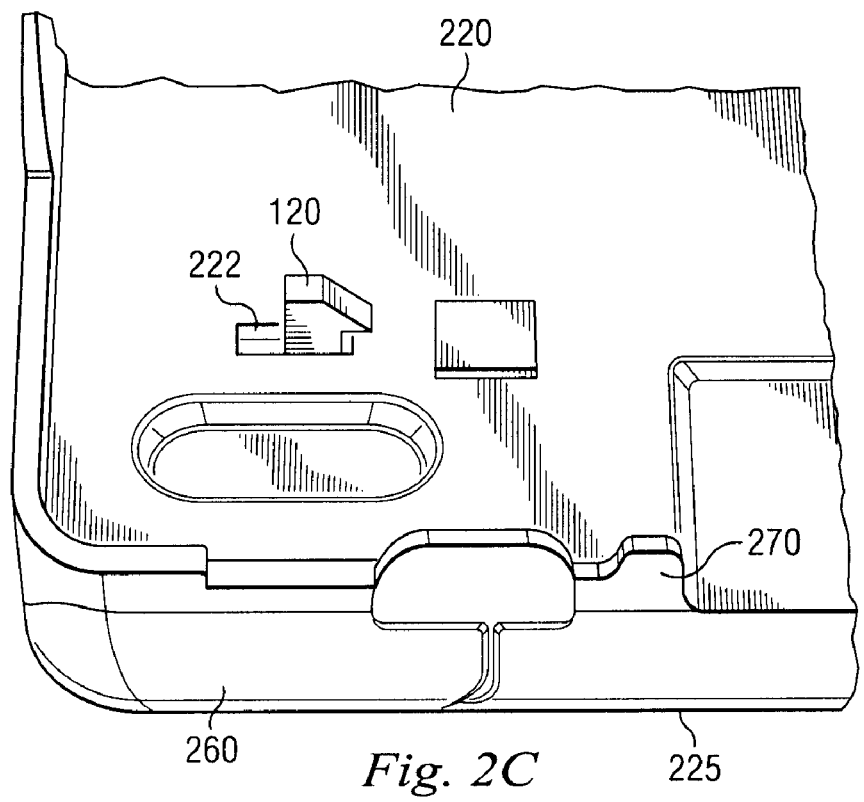
FIG. 2C illustrates additional detail of a moveable rear latch included in the docking device of FIG. 2A, according to an embodiment.

FIGS. 2B and 2C illustrates additional detail of a moveable latch included in the docking device 210, according to an embodiment. The pair of moveable rear latches 120 and moveable front latches 240 are affixed (not shown) to the bottom section 225, and are aligned substantially perpendicular to the bottom section 225. The planar top section 220 receives the bottom section 102 of the portable device 101 for docking. The top section 220 includes four openings 222, one for each of the pair of moveable rear latches 120 and moveable front latches 240 to permit latching on to corresponding matching slots of the portable device 101 when docked. The height of the moveable latches 120 and 240 is sufficient to facilitate the latching.

Each moveable latch in the pair of moveable rear latches 120 and the moveable front latches 240 typically includes a spring mechanism (not shown). The pair of latches 120 and 240 and the bottom section 102 of the portable device 101 may be positioned at an angle. Thus, the application of a substantially vertical force on the portable device 101 generates a lateral force on the pair of latches 120 and 240. When the lateral force, which is substantially parallel to the planar top section 110, is applied to the moveable latch, it causes a slight movement of the latch thereby increasing the tension in the spring mechanism. Depending on the implementation, the slight movement may be in an inward or outward direction relative to the normal position of the moveable latch. In one embodiment, the slight movement is approximately 20 degrees. The lateral force is withdrawn when the pair of moveable latches 120 and 240 'latch on', 'snap on' or 'dock to' the pair of matching slots included on the bottom section 102 of the portable device 101. When properly docked, the pair of moveable latches 120 and 240 return to their normal position and the spring mechanism loses the tension.

Referring back to FIG. 2A, to properly dock the portable device 101 to the docking device 210, the user has to simply place the portable device 101 on top section 220 of the docking device 210 and press on the portable device 101 to dock. That is, the user aligns the portable device 101 with the docking device 210 in a substantially vertical direction. A substantially vertical force is applied on the portable device 101 to cause the moveable latches 120 and 240 to slightly move and latch on to the corresponding slots of the portable device 101 to dock. The magnitude of the vertical force applied is sufficient to cause the docking. The docking system 200 advantageously eliminates the need to toe in the portable device 101 in to the docking device 210 for proper docking. The stable surface used to place the portable device 101 provides sufficient strength to withstand the vertical force being applied to the portable device 101 for docking.

Figure 2D:
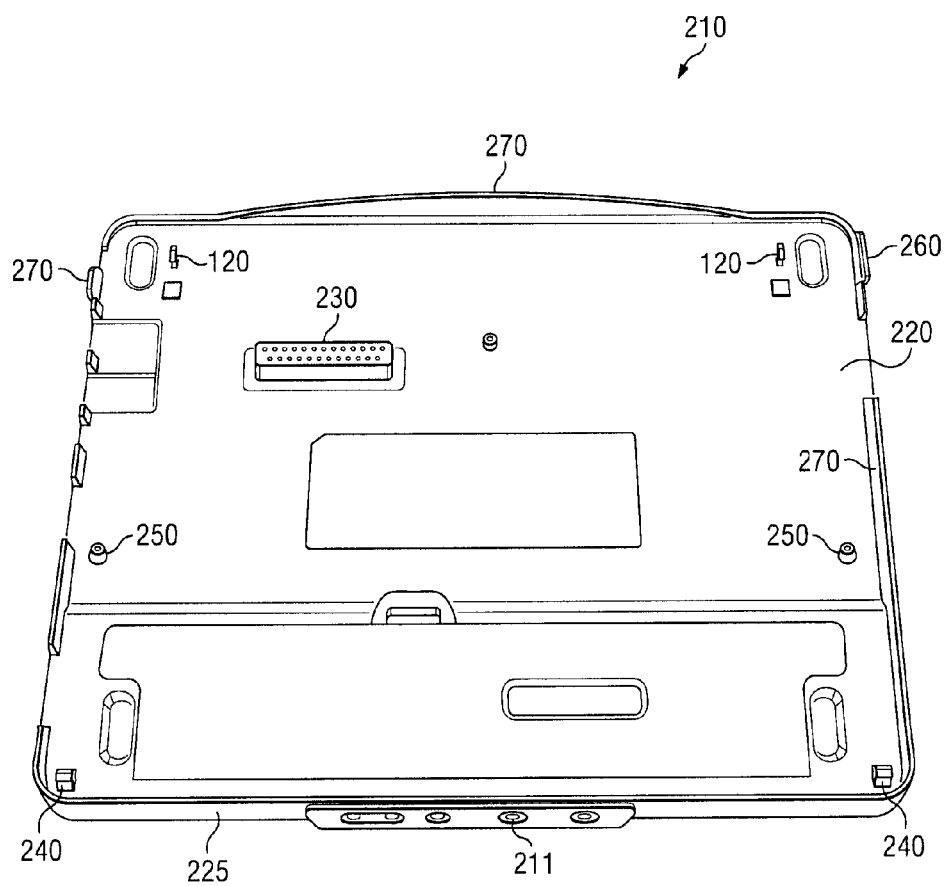
FIG. 2D illustrates further detail of the docking device of FIG. 2A to improve alignment, according to an embodiment.

FIG. 2D illustrates further detail of the docking device 210 to improve alignment, according to an embodiment. To assist the docking process, a pair of alignment pins 250 are included on the substantially planar top section 220. The portable device 101 includes a corresponding pair of notches (not shown) located on the bottom section 102 of the portable device 101 such that when properly aligned the pair of alignment pins 250 mate with corresponding the notches on the portable device 101 when the two devices are docked. A single release latch 260, which may be located on the right or left side of the docking device 210, is operable to undock the two devices. Additionally, for improved alignment, the front, rear, left and right sides of the docking device 210 are selectively raised as fins 270 to properly align the two devices or guide in the alignment of the two devices.

Figure 3:
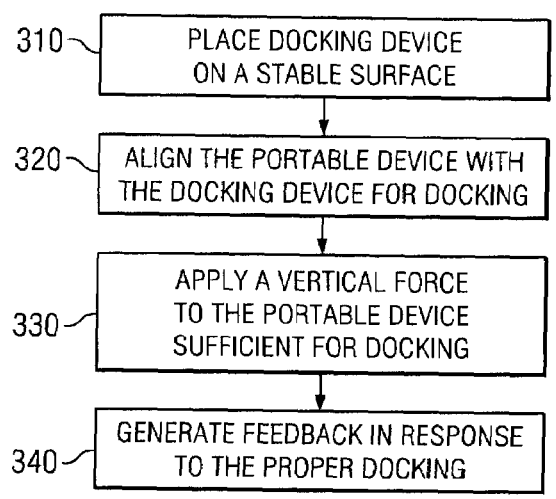
FIG. 3 is a flow chart illustrating a method for an improved docking system, according to an embodiment.

FIG. 3 is a flow chart illustrating a method for an improved docking between the docking device 210 and the portable device 101. In step 310, the docking device 210 is placed on a stable surface. The stable surface may be flat or irregular. However, the stable surface has sufficient strength to withstand the vertical force being applied to the portable device 101 for docking. In step 320, the portable device 101 is aligned with the docking device 210 in a substantially vertical direction. In one embodiment, the pair of alignment pins 250 being placed to mate with the corresponding notches on the portable device 101 and the presence of fins 270 advantageously facilitate the alignment. In step 330, a substantially vertical force is applied to the portable device 101 to cause the docking. The magnitude of the force applied is sufficient to cause the docking.

Various steps described above may be added, omitted, combined, altered, or performed in different orders. For example, step 340 may be added to provide positive feedback that the two devices have properly docked and are communicating via the electrical connector 230. In one embodiment, the feedback may be displayed by turning on a light emitting diode 211 on the portable device 101.

Figure 4:
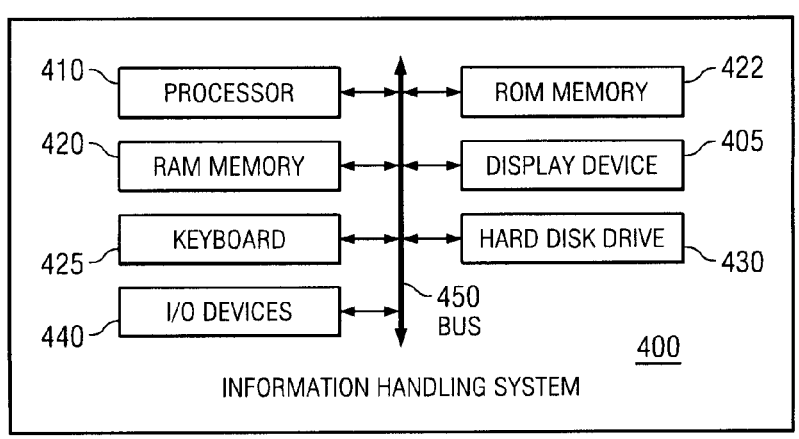
FIG. 4 illustrates a block diagram of an information handling system to implement method or apparatus aspects of the present disclosure, according to an embodiment.

FIG. 4 illustrates a block diagram of an information handling system to implement method or apparatus aspects of the present disclosure, according to an embodiment. For purposes of this disclosure, an information handling system 400 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the information handling system 400 may be a personal computer, a network storage device, or any other suitable device and may vary in size, shape, performance, functionality, and price.

The information handling system 400 may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring to FIG. 4, the information handling system 400 includes a processor 410, a system random access memory (RAM) 420, a system ROM 422, a display device 405, a keyboard 425 and various other input/output devices 440. It should be understood that the term "information handling system" is intended to encompass any device having a processor that executes instructions from a memory medium. The information handling system 400 is shown to include a hard disk drive 430 connected to the processor 410 although some embodiments may not include the hard disk drive 430. The processor 410 communicates with the system components via a bus 450, which includes data, address and control lines. A communications device (not shown) may also be connected to the bus 450 to enable information exchange between the system 400 and other devices.

In one embodiment, the information handling system 400 may be used to implement the portable device 101 described in FIG. 1. The electrical connector 230 may be used to electrically couple the processor 410 and at least one peripheral device (PD) as mentioned above and shown in FIG. 2A, when the portable device 101 is docked to the docking station 210.

The processor 410 is operable to execute the computing instructions and/or operations of the information handling system 400. The memory medium, e.g., RAM 420, preferably stores instructions (also known as a "software program") for implementing various embodiments of a method in accordance with the present disclosure. In various embodiments the one or more software programs are implemented in various ways, including procedure-based techniques, component-based techniques, and/or object-oriented techniques, among others. Specific examples include assembler, C, XML, C++ objects, Java and Microsoft Foundation Classes (MFC). For example, in one embodiment, the BIOS program described may be implemented using an assembler language code.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claim is:

1. A method for detachably docking a portable device to a docking device, the method comprising:
   placing the docking device on a stable surface, wherein the docking device includes a pair of moveable rear latches and a pair of moveable front latches;
   aligning the portable device with the docking device in a substantially vertical direction;
   applying a substantially vertical force on the portable device to cause the docking, wherein the pair of moveable rear latches and the pair of moveable front latches are operable to resiliently spread apart in opposite directions to movably latch on to corresponding matching slots of the portable device when docked whereby the portable device is secured to the docking device;
   providing a plurality of side sections on the docking device, at least one of the side sections including an alignment fin; and
   indicating with a light emitting diode that is located on the portable device that the portable device and the docking device are properly docked and are communicating via an electrical connector.

2. The method of claim 1, wherein the aligning includes alignment of a pair of alignment pins included in the docking device with corresponding notches on the portable device.

3. The method of claim 2, wherein the applying the substantially vertical force causes the pair of alignment pins to mate with the corresponding notches.

4. The method of claim 1, the docking device comprising:
   a substantially planar bottom section capable of being placed on the stable surface, wherein the pair of moveable rear latches and the pair of moveable front latches are affixed to the bottom section, wherein the pair of moveable rear latches and pair of moveable front latches are aligned substantially perpendicular to the bottom section;
   a substantially planar top section being operative to receive a bottom section of the portable device for docking, wherein the top section includes openings for the pair of moveable rear latches and the pair of moveable front latches to permit latching on to corresponding matching slots of the portable device when docked, wherein the docking causes the pair of alignment pins included in the top section to mate with the corresponding notches; and
   wherein at least one of the side sections includes a release latch operable to undock the portable device.

5. The method of claim 4, wherein the top section includes at least one electrical connector for electrically coupling the portable device to the docking device when docked.

6. The method of claim 1, wherein applying the substantially vertical force causes the pair of moveable rear latches and the pair of moveable front latches to be slightly moved in an outwardly or inwardly direction.

7. The method of claim 6, wherein the slight movement of the pair of the moveable rear latches and the pair of moveable front latches enables the corresponding matching slots to latch in response to the substantially vertical force.

8. The method of claim 6, wherein the slight movement is about 20 degrees.

9. The method of claim 1, wherein each of the pair of moveable rear latches and the pair of moveable front latches include a spring mechanism capable of providing a lateral force to latch the portable device in response to the substantially vertical force, wherein the spring mechanism is in a loaded position while the portable device is being docked and in an unloaded position when portable device is docked.

10. A docking system operable to detachably dock a portable device, the system comprising:
a pair of moveable rear latches and a pair of moveable front latches, wherein the pair of moveable rear latches and the pair of moveable front latches are operable to resiliently spread apart in opposite directions to latch on to corresponding matching slots of the portable device in response to an application of a substantially vertical force on the portable device for docking whereby the portable device is secured to the docking device;
a pair of alignment pins, wherein the pair of alignment pins are operable to mate with corresponding notches on the portable device when the portable device is docked;
a plurality of side sections on the docking device, at least one of the side sections including an alignment fin; and
a light emitting diode located on the portable device and operable to indicate that the portable device and the docking device are properly docked and are communicating via an electrical connector.

11. The system of claim 10, comprising:
a substantially planar bottom section, wherein the pair of moveable rear latches and the pair of moveable front latches are affixed to the bottom section, wherein the pair of moveable rear latches and the pair of moveable front latches are aligned substantially perpendicular to the bottom section;
a substantially planar top section being operative to receive a bottom section of the portable device for docking, wherein the top section includes openings for the pair of moveable rear latches the pair of and moveable front latches to corresponding matching slots of the portable device when docked, wherein the docking causes the pair of alignment pins included in the top section to mate with the corresponding notches; and
wherein at least one of the side sections includes a release latch operable to undock the portable device.

12. The system of claim 11, wherein the top section includes at least one electrical connector for electrically coupling the portable device to the docking device when docked.

13. The system of claim 10, wherein applying the substantially vertical force on the portable device causes the pair of moveable rear latches and the pair of moveable front latches to be slightly moved in an outwardly or inwardly direction.

14. The system of claim 13, wherein the slight movement of the pair of the moveable rear latches and the pair of moveable front latches enables the corresponding matching slots to latch in response to the substantially vertical force.

15. The system of claim 13, wherein the slight movement is about 20 degrees.

16. The system of claim 10, wherein each of the pair of moveable rear latches and each of the pair of moveable front latches include a spring mechanism capable of providing a lateral force to latch the portable device in response to the vertical force, wherein the spring mechanism is in a loaded position while the portable device is being docked and in an unloaded position when the portable device is docked.

17. The system of claim 10, wherein the docking system substantially resembles a rectangular prism.

18. An information handling system comprising:
a portable device, wherein the portable device includes:
a processor;
a system bus;
a memory coupled to the processor through the system bus;
a light emitting diode; and
a docking device having at least one peripheral device, wherein the docking device is operable to detachably dock the portable device, wherein the docking device includes:
a pair of movable rear latches and a pair of movable front latches, wherein the pair of moveable rear latches and the pair of moveable front latches are operable to resiliently spread apart in opposite directions to latch on to corresponding matching slots of the portable device in response to an application of a substantially vertical force on the portable device for docking whereby the portable device is secured to the docking device;
a plurality of side sections on the docking device, at least one of the side sections including an alignment fin;
a pair of alignment pins, wherein the pair of alignment pins are operable to mate with corresponding notches of the portable device when the portable device is docked; and
a connector to electrically couple the processor and the at least one peripheral device when the portable device is docked, wherein
the light emitting diode located on the portable device is operable to indicate that the portable device and the docking device are properly docked and are communicating via the electrical connector.

19. The system of claim 18, wherein applying the vertical force causes the pair of moveable rear latches and the pair of moveable front latches to be slightly moved in an outwardly or inwardly direction.

20. The system of claim 18, wherein each of the pair of moveable rear latches and the pair of moveable front latches include a spring mechanism capable of providing a lateral force to latch the portable device in response to the vertical force, wherein the spring mechanism is in a loaded position while the portable device is being docked and in an unloaded position when the portable device is docked.

21. An information handling system comprising:
a portable device, wherein the portable device includes:
a chassis;
a microprocessor mounted in the chassis;
a storage coupled to the microprocessor;
a light emitting diode; and
a docking device having at least one peripheral device, wherein the docking device is operable to detachably dock the portable device, wherein the docking device includes:
a pair of moveable rear latches and a pair of movable front latches, wherein the pair of moveable rear latches and the pair of moveable front latches are operable to resiliently spread apart in opposite directions to latch on to corresponding matching slots of the portable device in response to an application of a substantially vertical force on the portable device for docking whereby the portable device is secured to the docking device;
a plurality of side sections on the docking device, at least one of the side sections including an alignment fin;

a pair of alignment pins, wherein the pair of alignment pins are operable to mate with corresponding notches on the portable device when the portable device is docked; and a connector to electrically couple the processor and the at least one peripheral device when the portable device is docked, wherein the light emitting diode located on the portable device is operable to indicate that the portable device and the docking device are properly docked and are communicating via the electrical connector.

* * * * *

UNITED STATES PATENT AND TRADEMARK OFFICE
CERTIFICATE OF CORRECTION

| | |
|---|---|
| PATENT NO. | : 7,256,990 B2 |
| APPLICATION NO. | : 10/652359 |
| DATED | : August 14, 2007 |
| INVENTOR(S) | : David W. Grunow et al. |

Page 1 of 1

It is certified that error appears in the above-identified patent and that said Letters Patent is hereby corrected as shown below:

Column 9, Line 2, between "when" and "portable" insert --the--.

Column 9, Lines 24-40, Claim 11 should read:
--11.  The system of claim 10, comprising:
   a substantially planar bottom section, wherein the pair of moveable rear latches and the pair of moveable front latches are affixed to the bottom section, wherein the pair of moveable rear latches and the pair of moveable front latches are aligned substantially perpendicular to the bottom section;
   a substantially planar top section being operative to receive a bottom section of the portable device for docking, wherein the top section includes openings for the pair of moveable rear latches and the pair of moveable front latches to permit latching on to corresponding matching slots of the portable device when docked, wherein the docking causes the pair of alignment pins included in the top section to mate with the corresponding notches; and
   wherein at least one of the side sections includes a release latch operable to undock the portable device.--

Column 10, Line 24, delete "of" and insert --on--.

Signed and Sealed this

Sixth Day of May, 2008

JON W. DUDAS
*Director of the United States Patent and Trademark Office*